(12) United States Patent
Jo et al.

(10) Patent No.: US 11,422,726 B1
(45) Date of Patent: Aug. 23, 2022

(54) EFFICIENT STORAGE DEVICE DATA MOVE OPERATION BASED ON PRIORITY OF GARBAGE COLLECTION COMMAND

(71) Applicant: Amazon Technologies, Inc., Seattle, WA (US)

(72) Inventors: Keun Soo Jo, Bellevue, WA (US); Munif M. Farhan, Clyde Hill, WA (US); Seth William Markle, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/968,539

(22) Filed: May 1, 2018

(51) Int. Cl.
*G06F 3/06* (2006.01)

(52) U.S. Cl.
CPC ............ *G06F 3/0646* (2013.01); *G06F 3/067* (2013.01); *G06F 3/0613* (2013.01); *G06F 2212/7205* (2013.01)

(58) Field of Classification Search
CPC ...... G06F 3/0646; G06F 3/067; G06F 3/0613; G06F 2212/7205; G06F 3/0647; G06F 2212/7201
See application file for complete search history.

(56) References Cited

U.S. PATENT DOCUMENTS

| | | | | |
|---|---|---|---|---|
| 5,860,124 A * | 1/1999 | Matthews | ............ | G06F 3/0619 711/159 |
| 9,558,232 B1 * | 1/2017 | Taylor | ..................... | G06F 3/061 |
| 2004/0250092 A1 * | 12/2004 | Hori | ................. | G11B 20/00086 713/189 |
| 2012/0210092 A1 * | 8/2012 | Feldman | ............ | G11B 20/1258 711/171 |
| 2014/0195725 A1 * | 7/2014 | Bennett | ................... | G06F 12/06 711/103 |
| 2014/0215129 A1 * | 7/2014 | Kuzmin | ............. | G06F 12/0246 711/103 |
| 2014/0281338 A1 * | 9/2014 | Choi | .................. | G06F 12/0269 711/170 |
| 2015/0212938 A1 * | 7/2015 | Chen | ..................... | G06F 12/023 711/166 |
| 2015/0347295 A1 * | 12/2015 | Ihm | ..................... | G06F 12/0253 711/103 |
| 2016/0306588 A1 * | 10/2016 | Li | ......................... | G06F 3/0619 |
| 2019/0087323 A1 * | 3/2019 | Kanno | ................ | G06F 12/0246 |

* cited by examiner

*Primary Examiner* — Chie Yew
(74) *Attorney, Agent, or Firm* — Klarquist Sparkman, LLP

(57) ABSTRACT

Technologies are provided for a storage device data move command. A storage device can be configured to receive a data move (or garbage collection) command and, responsive to receiving the command, move data from one zone of the storage device (or range of storage locations within the storage device) to another zone (or another range of storage locations) within the storage device. The command can comprise a source zone identifier and a target zone identifier. The storage device can read data from a storage zone associated with the source zone identifier and write the data to another storage zone associated with the target zone identifier. The identifiers can include ranges of storage location addresses within the separate storage zones. In at least some embodiments, a host bus adapter can be configured to support the data move (or garbage collection) command for a storage device attached to the host bus adapter.

14 Claims, 9 Drawing Sheets

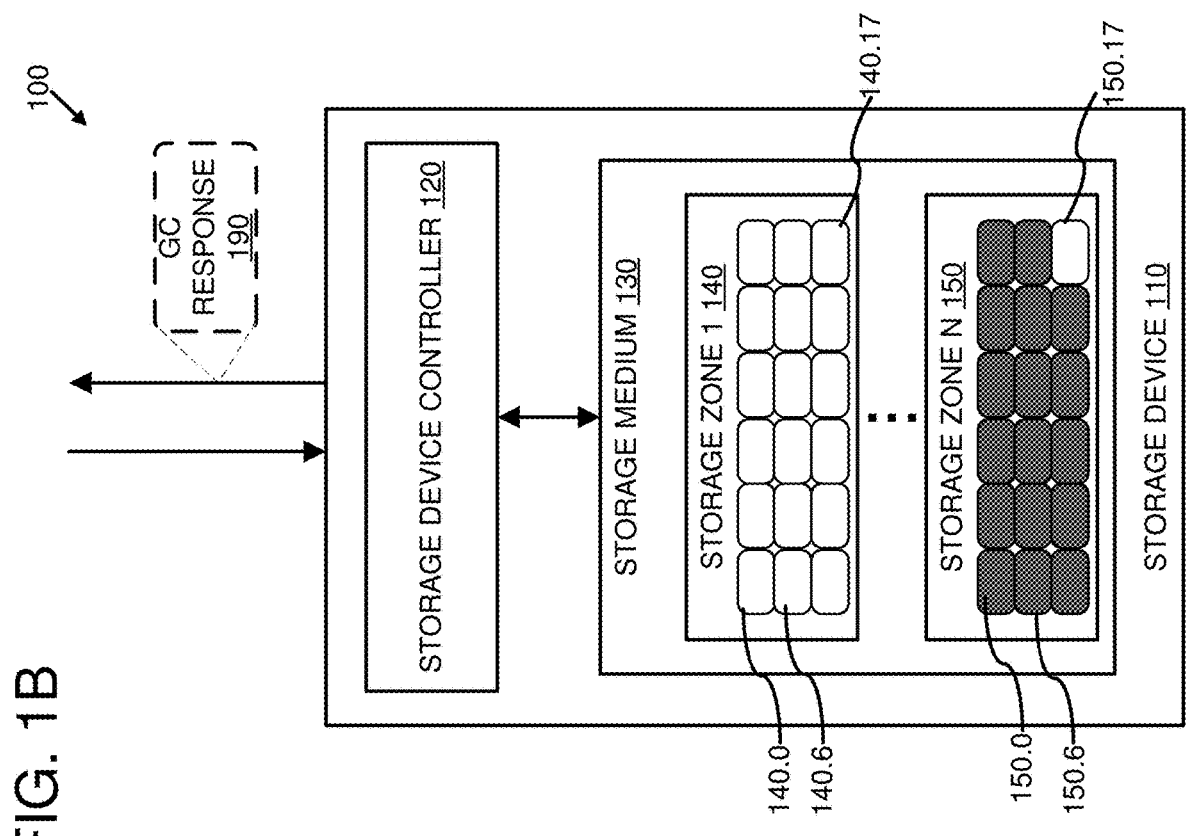
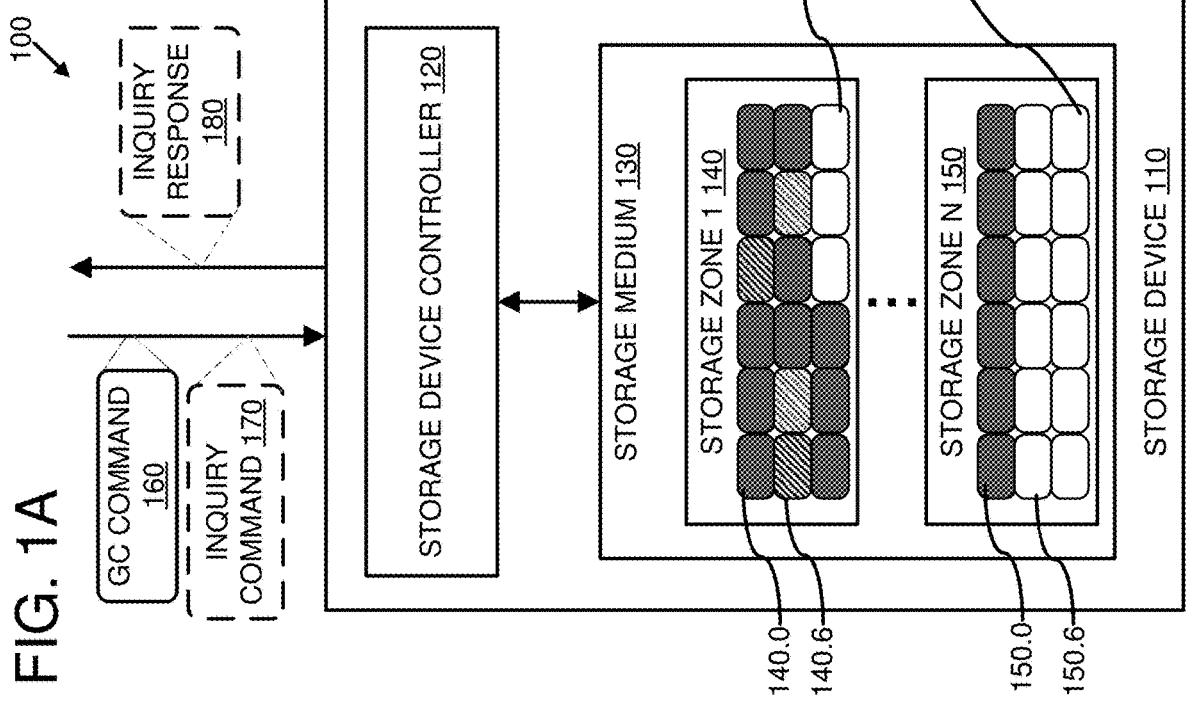

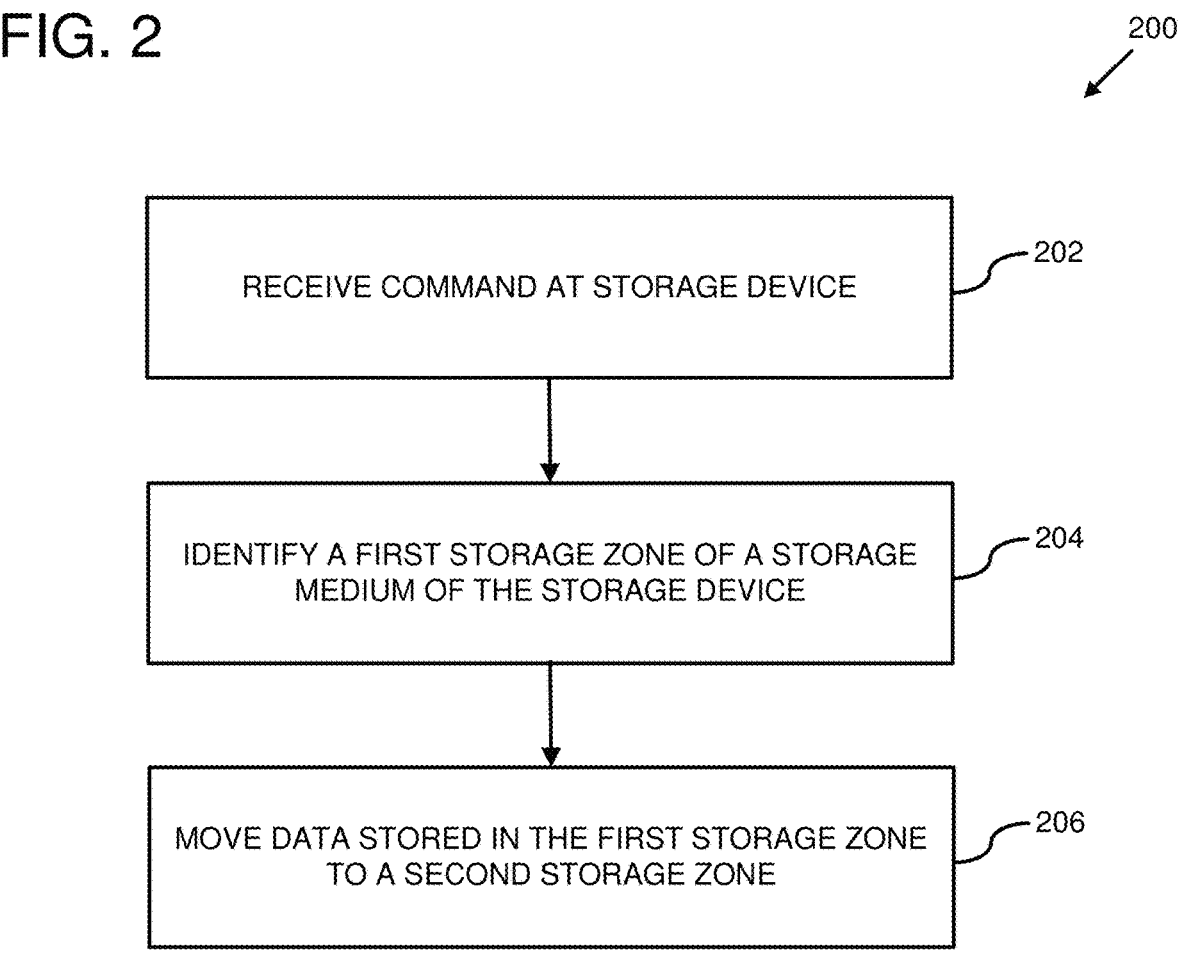

EFFICIENT STORAGE DEVICE DATA MOVE OPERATION BASED ON PRIORITY OF GARBAGE COLLECTION COMMAND

BACKGROUND

At least some storage devices (such as some solid state storage devices (SSDs) and some shingled magnetic recording (SMR) storage devices) organize data into multiple storage zones. At least some such storage devices (such as host-managed storage devices) allow connected host computers access to low-level commands and zone information, in order for the host computers to manage data access for the storage devices. In at least some cases, deleted (or invalid) data can build-up within a storage zone. In some such cases, free space within a zone can be "reclaimed" by rearranging the valid data within the zone or relocating the valid data within the zone in order to free the zone up for additional data storage.

BRIEF DESCRIPTION OF THE DRAWINGS

FIGS. 1A-B are system diagrams depicting an example system configured to support a storage device garbage collection command.

FIG. 2 is a flowchart of an example method for processing a storage device garbage collection command.

DETAILED DESCRIPTION

Figure 3:
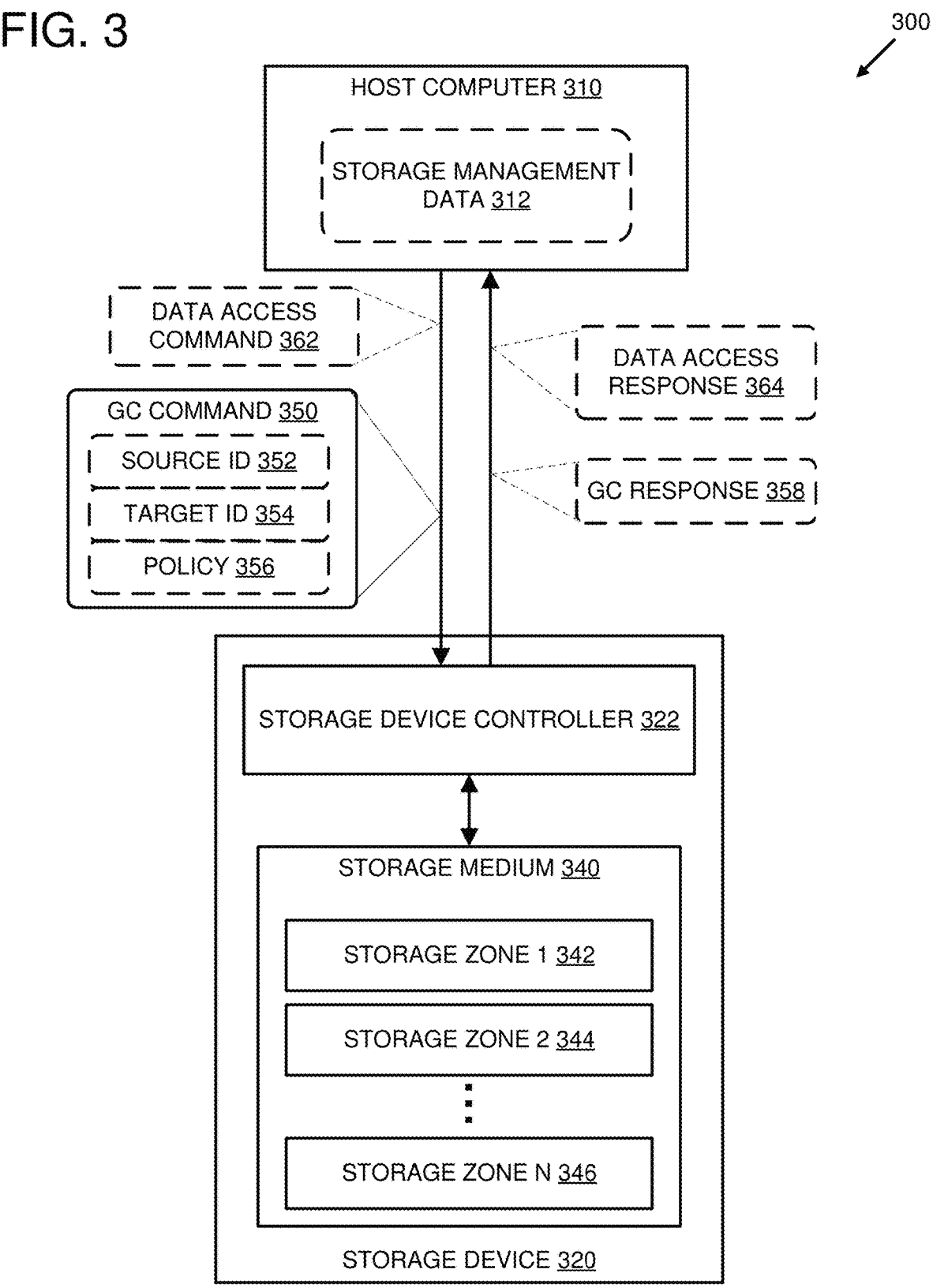
FIG. 3 is a system diagram depicting an example system comprising a host computer and a storage device configured to support a garbage collection command.

In scenarios where a sufficient number of storage locations in a storage zone contain deleted (or invalid) data, it may be advantageous to "reclaim" the storage zone by moving the remaining valid data from the storage zone to another storage zone. This can consolidate the remaining valid data and make the reclaimed storage zone available for additional data storage. Such operations can sometimes be referred to as "garbage collection" operations. In at least some cases, such garbage collection operations can require large amounts of data input/output (I/O) operations and communication channel bandwidth. For example, a host computer connected to a storage device may have to perform multiple data read operations to retrieve data from one storage zone of a storage device, and then perform multiple data write operations to write the data back to another storage zone of the storage device. In scenarios where the host computer is connected to the storage device via a computer network, garbage collection operations can consume network bandwidth as well, as the data is transported over the network twice: once from the storage device to the host computer, and then back to the storage device from the host computer.

At least some of the embodiments of the technologies described herein solve these problems by enabling support for a data move command (or garbage collection command) that can be transmitted from a computing device (such as a host computer) to a storage device. Upon receipt of the command, the storage device can copy or move data from one storage zone to another storage zone without transmitting the data to the computing device.

For example, a storage device can be configured to receive a data move command, wherein the data move command identifies a source range of storage locations and a target range of storage locations within the storage device. The storage device can be configured to process the command by reading data stored in the source range of storage locations and writing the data to the target range of storage locations. In at least some embodiments, the source range of storage locations and the target range of storage locations can be located in separate storage zones of the storage device.

In a different or further embodiment, an intermediate device (such as a host bus adapter or the like) can be configured to support data move commands for an attached storage device. For example, a host bus adapter can be configured to receive a data move command from a computing device (such as a host computer) and to process the data move command by performing one or more data access operations to read data from a source range of storage locations in the attached storage device and then write the data to a target range of storage locations in the attached storage device.

FIG. 1A is a system diagram depicting an example system 100 comprising a storage device 110 configured to support a garbage collection command 160. The storage device 110 comprises a storage medium 130 and a storage device controller 120. The storage medium 130 comprises a plurality of storage zones 140-150. The storage device controller 120 is configured to receive the garbage collection command 160 and to process the command 160 by moving data stored in one or more of the storage zones 140-150 to one or more other of the storage zones 140-150.

The storage zones 140-150 each comprise multiple physical storage locations (e.g., 140.0, 140.6, 140.17, and 150.6) in which data can be stored. In FIGS. 1A and 1B, the multiple physical storage locations in the storage zones 140-150 are represented as two-dimensional grids of rectangular elements. However, this is for illustration and is not intended to necessarily be an accurate representation of the physical layout of the storage medium 130. The actual physical arrangement of the storage locations within the storage zones 140-150 can vary based on the type of the storage medium 130 (magnetic disk, solid state storage, DRAM storage, etc.). In FIGS. 1A and 1B, storage zones 140 and 150 are each depicted as containing 18 storage locations (140.0-140.17 and 150.0-150.17, respectively). The number of storage locations represented FIGS. 1A and 1B is not intended to be limiting. More or fewer physical storage locations within each storage zone are possible.

The solid white storage locations (e.g., 140.17, 150.6, and 150.17) represent physical storage locations in the storage medium 130 that do not contain data. The solid gray storage locations (e.g., 140.0 and 150.0) represent physical storage locations that contain data. The gray and white striped storage locations (e.g., 140.6) represent physical storage locations that are no longer valid (such as storage locations where data has been deleted (or marked as deleted), etc.). For example, an invalid storage location may contain data that has been marked as deleted but that needs to be cleared before new data can be written to the service location. Additionally or alternatively, the invalid storage locations may be storage locations that do not contain data, but cannot readily be used to store data. For example, in storage media where data is recorded in an overlapping storage format (such as an SMR storage format), it may not be possible to write data to a storage location such as 140.6 without re-writing the entire storage zone 140. In such an embodiment, a storage location such as 140.6 may effectively be unusable until a garbage collection operation is performed to reclaim the storage zone 140. These examples are provided for illustration and are not intended to be limiting. Other types of invalid storage locations are also possible, and may vary based on the type of the storage medium 130.

Responsive to receipt of the garbage collection command 160, the storage device controller 120 can be configured to process the garbage collection command 160 by reclaiming one or more storage zones (such as storage zone 140) in the storage medium 130.

FIG. 2 is a flowchart of an example method 200 for processing a storage device garbage collection command. At least some of the example systems described herein can be used to perform the example method 200. For example, the storage device controller 120 depicted in FIG. 1A can be configured to process the garbage collection command 160 according to the example method 200.

At 202, a command is received at a storage device. Example commands include data move commands, garbage collection commands, etc. The command can be received from a computing device connected to the storage device via one or more physical connections (such as a cable, communication bus, etc.), one or more logical connections (such as computer network connections, etc.), or a combination thereof.

In at least some embodiments, the command comprises a source zone identifier and a target zone identifier. A zone identifier can comprise one or more values that uniquely identify a storage zone (or a range of storage locations within a storage zone) of the storage device. For example, a storage zone identifier can be a storage location address associated with a first storage location within the storage zone. Additionally or alternatively, a storage zone identifier can comprise a range of storage locations within a storage zone. Such a range of storage locations can be defined by a starting storage location address and/or an ending storage location address. In a scenario where a starting location address is provided but no ending storage location address is provided (or a null value is provided for the ending storage location), the ending storage location address can be determined to be an address of a last storage location within the storage zone. In a scenario where an ending location address is provided but no starting storage location address is provided (or a null value is provided for the starting storage location), the starting storage location address can be determined to be an address of a first storage location within the storage zone. A storage location address can be a logical identifier associated with a physical storage location within a storage zone (such as a logical block address (LBA) for a data block within the storage zone, etc.).

At 204, a first storage zone of a storage medium of the storage device is identified. Identifying the first storage zone can comprise locating a storage zone within a storage medium of the storage device that is in need of garbage collection. In an embodiment where the command comprises a source storage zone identifier, identifying the first storage zone can comprise determining that the first storage zone, or a range of storage locations within the first storage zone, is/are associated with the source storage zone identifier.

At 206, data stored in the first storage zone is moved to a second storage zone of the storage medium of the storage device. Moving the data can comprise performing one or more data read operations to read the data from one or more storage locations within the first storage zone, and performing one or more sequential data write operations to write the data to a contiguous range of storage locations within the second storage zone. In at least some embodiments, the second storage zone can be identified as a storage zone in the same (or different) storage medium of the storage device that contains a range of contiguous, available storage locations that is of a sufficient size to hold the data stored in the first storage zone.

In an embodiment where the command comprises a target storage zone identifier, the second storage zone can be identified by determining that the second storage zone, or a range of storage locations within the second storage zone, is/are associated with the target storage zone identifier. In an embodiment where the command comprises a source zone identifier comprising a source range of data block addresses and a target zone identifier comprising a target range of data block addresses, moving the data stored in the first storage zone to the second storage zone can comprise reading data from the range of data block addresses within the first storage zone and writing the data to the range of data block addresses within the second storage zone.

As used herein, the terms "first storage zone" and "second storage zone" are used to indicate that the two storage zones can be different storage zones. The terms do not necessarily indicate an order in which the storage zones occur in storage media of a storage device.

In at least some embodiments, a data access command (i.e., a command to read, write, and/or delete data stored in the storage medium of the storage device) can be received prior to completion of the moving the data from the first storage zone to the second storage zone. For example, moving the data may comprise multiple data read and/or data write operations, and the storage device controller may be configured to receive and process data access commands while the processing of the moving the data is still underway. Processing the data access command can be prioritized over the completion of the moving the data stored in the first storage zone to the second storage zone. For example, processing the data access command may comprise performing one or more read and/or write operations targeting storage location(s) in the storage medium of the storage device. The storage device controller may perform these read and/or write operations before completing any remaining read and/or write operations for the processing of the moving of the data. In such a context, the processing of the command can be regarded as a "background process," that is given a lower priority than user-driven data access commands.

Referring again to FIG. 1A, in a particular scenario, the garbage collection command 160 can comprise a source storage zone identifier and a target storage zone identifier (not shown). The storage device controller 120 can be configured to determine that the source storage zone identifier is associated with the storage zone 140, and that the target storage zone identifier is associated with the storage zone 150. The storage device controller 120 can be configured to read from storage locations in the storage zone 140 that contain data (e.g., 140.0-140.2, 140.4-140.5, 140.8-140.9, and 140.11-140.14). The storage device controller 120 can then write the data to storage locations in the storage zone 150. For example, the storage device controller can write the data to a range of contiguous storage locations within the storage zone 150 (such as 150.6-150.16). In at least some embodiments, the target zone identifier indicates the range of storage locations within the target storage zone where the data is to be written.

Optionally, the storage device controller 120 can be configured to receive a garbage collection support inquiry command 170, and to transmit a response 180, indicating that the garbage collection command 160 is supported. The inquiry command 170 can be a general capabilities inquiry command, whereby a transmitter can poll the storage device 110 for supported features. In at least some embodiments, the storage device controller 120 can be configured to process the inquiry command 170 by inspecting a firmware (not shown) of the storage device to determine whether the firmware contains instructions for use in processing the garbage collection 160.

In at least some embodiments, the storage device controller 120 can be configured to write the data to the target storage zone by performing one or more appending write operations. The appending write operations can comprise one or more sequential write operations to store the data in one or more contiguous storage locations in the target storage zone. For example, referring to FIG. 1A, in the scenario where the data has been read from the storage locations in the storage zone 140 (e.g., 140.0-140.2, 140.4-140.5, 140.8-140.9, and 140.11-140.14) by the storage device controller 120, one or more appending write operations can be used to write the data to the contiguous storage locations 150.6-150.16 in the storage zone 150.

FIG. 1B is a system diagram depicting the example system 100 after the storage device controller 120 has processed the garbage collection command 160. The data that was previously stored in the storage zone 140 has been moved to the storage locations 150.6-150.16 in the storage zone 150.

In at least some embodiments, the storage locations of the storage zone 140 (e.g., 140.0-140.17) can be marked as erased. For example, one or more storage management data structures (maintained within the storage device 110 and/or externally to the storage device 110) can be updated to indicate that the storage zone 140 has been reclaimed and is available for data storage. In a different or further embodiment (for example, where the storage medium 130 is a solid state storage medium), the storage locations of the storage zone 140 can be cleared to make the storage locations 140.0-140.17 available for data storage.

Although FIG. 1B depicts the data previously stored in storage zone 140 as all being moved to the storage zone 150, this is for illustration purposes and is not intended to be limiting. Other data relocation strategies are also possible. For example, if no single storage zone is available with sufficient space for all the data stored in the storage zone 140, the data may be stored across multiple storage zones. In at least some embodiments, the garbage collection command 160 can comprise multiple source and target address ranges. In such an embodiment, the storage device controller 120 can be configured to move data from the multiple source address ranges to the multiple target address ranges. Such pairs of source and target address ranges may all be associated with a same source storage zone and target storage zone, respectively. However, it is also possible for various, different storage zones to be associated with the multiple source address ranges and/or the multiple target address ranges.

In a particular example, the garbage collection command 160 comprises multiple pairs of source and target address ranges: a first pair comprising a source block address range of 140.0-140.2 and a target block address range of 150.6-150.8; a second pair comprising a source block address range of 140.4-140.5 and a target block address range of 150.9-150.10; a third pair comprising a source block address range of 140.8-140.9 and a target block address range of 150.11-150.12; and a fourth pair comprising a source block address range of 140.11-140.14 and a target block address range of 150.13-150.16.

The storage device controller 120 can be configured to process each pair of source and target address ranges by reading data from the data blocks in the storage zone 140 associated with the source block address range and writing the data to the data blocks in the storage zone 150 associated with the target block address range. In at least some cases, the storage device controller 120 can be configured to determine that target address ranges in multiple received source/target address rang pairs are contiguous. Upon determining that the multiple target address ranges are contiguous, the storage device controller 120 can read the data from the multiple associated source address ranges into a buffer and can then write the buffered data to the data blocks associated with the contiguous address ranges using one or more sequential data write operations.

Optionally, the storage device controller 120 can be configured to transmit a response 190, indicating that the garbage collection process has been completed. The response 190 can comprise a value indicating whether the requested garbage collection was performed and/or whether the garbage collection was successful or resulted in an error. For example, in a scenario where the integrity of the data is checked before the data is moved to another storage zone, if the data has been damaged and is unrecoverable, the response 190 may indicate that the garbage collection could not be completed due to an unrecoverable data corruption in the source storage location(s).

In any of the examples described herein, a storage device can be a device capable of storing data in one or more physical storage media. For example, the storage device can be a magnetic storage device, such as a hard disk drive, that is capable of storing data in one or more magnetic recording formats. Other examples of storage devices include flash storage devices (such as NAND-type flash devices and NOR-type flash devices), and random access data storage devices (such as DRAM devices). Further examples of storage devices include non-volatile dual in-line memory modules (NVDIMMs). In at least some embodiments, the storage device can be contained within a host computer.

In some embodiments, the storage device comprises multiple disparate storage media. For example, the storage device can be a hard disk drive that comprises one or more magnetic disks and an internal memory. In another example, the storage device comprises solid state storage and magnetic storage. Other combinations of disparate storage media are also possible.

A storage device can organize storage locations into multiple storage zones. For at least some storage devices (such as zoned SMR storage devices), random-access write operations can be performed by reading all data from a zone, updating the retrieved data, and writing the updated data back to the zone.

A storage device can include a storage device controller. A storage device controller can comprise one or more hardware components, such as a firmware, of the storage device. The storage device controller can be configured to interface with an external communications channel in order to receive and process commands from one or more computing devices.

In any of the examples described herein, a data block (or block of data) can be a sequence of data units, such as bytes, bits, etc., that has a fixed size (sometimes referred to as a "block size"). In a storage device that supports data blocks, data is read from and/or written to the storage device one block at a time. A data block can have a physical address that identifies a position where it is stored in the storage device and a logical address, such as a logical block address (LBA), which is used by external components to identify and access the data block. By using logical addresses, the physical storage locations of data blocks in the storage device can change without having to notify or update any external components.

In any of the examples described herein, a host computer can be a server or other computing device that comprises a processor and is connected to a storage device. The host computer is connected to the storage device and configured to transmit commands, such as data access commands (i.e., commands to perform data read and write operations), inquiry commands, data move commands, garbage collection commands, or the like, to the storage device. The host computer can be configured to receive command responses from the storage device. The connection can be a direct connection, such as a cable or bus connection, an indirect connection, such as a connection over a network, or some combination thereof. In scenarios where the host computer is connected to more than one storage device, the various connections can be of the same type or different types.

In some embodiments, the host computer can comprise a storage controller connected to multiple storage devices. In at least some embodiments, the host computer can be a computing device configured to provide a unified access point for multiple connected storage devices, such as a JBOD ("just a bunch of drives/disks") device, a RAID array controller, etc.

FIG. 3 is a system diagram depicting an example system 300 comprising a host computer 310 and a storage device 320 configured to support a garbage collection command 350. The host computer 310 is configured to transmit a garbage collection command 350 to the storage device 320. In at least some embodiments, the garbage collection command 350 comprises a source storage zone identifier 352 and a target storage zone identifier 354.

The storage device 320 comprises a storage device controller 322, and a storage medium 340. The storage medium 340 comprises a plurality of storage zones 342-346. Each of the respective storage zones contains a plurality of storage locations (such as data blocks, etc.). The storage device controller 322 is configured to receive the garbage collection command 350 from the host computer 310. Responsive to receipt of the garbage collection command 350, the storage device controller 322 can be configured to copy data from a first storage zone, of the plurality of storage zones 342-346, to a second storage zone, of the plurality of storage zones 342-346. Copying the data stored in the first storage zone to the second storage zone can comprise reading the data from various storage locations within the first storage zone, and writing the data to various storage locations within the second storage zone. In a different or further embodiment, the storage device controller 322 can be configured to read data from various storage locations within the first storage zone that currently store valid data, and to write the data to a sequential range of storage locations within the second storage zone. Optionally, the storage device controller 322 can be configured to transmit a response 358 to the host computer 310 once the processing of the garbage collection command 350 is complete.

In an embodiment where the garbage collection command 350 comprises the source zone identifier 352 and the target zone identifier 354, the storage device controller 322 can be configured to identify the first storage zone as a storage zone (e.g., storage zone 344), of the plurality of storage zones 342-346, that is associated with the source zone identifier 352 and to identify the second storage zone as a storage zone (e.g., storage zone 342), of the plurality of storage zones 342-346, that is associated with the target zone identifier 354. For example, the source zone identifier 352 can comprise a range of data block addresses within the first storage zone (e.g., storage zone 344) and the target zone identifier 354 can comprise a range of data block addresses within the second storage zone (e.g., storage zone 342). Copying the data stored in the first storage zone to the second storage zone can comprise reading the data from the range of data block addresses in the first storage zone and writing the data to the range of data block addresses in the second storage zone.

The host computer 310 can be configured to manage data storage operations for the storage device 320. For example, the host computer 310 can be configured to manage data storage and maintenance for the storage device 320 using a low-level command interface provided by the storage device controller 322. In such an embodiment, the storage device 320 can be referred to as a "host-managed storage device." Optionally, the host computer 310 can contain storage management data 312 that can be used by the host computer 310 to keep track of the status of the various storage zones 342-346 within the storage medium 340 of the storage device 320. For example, the storage management data 312 can indicate which storage locations of a given storage zone currently contain valid data, which storage locations of the storage zone are available (or empty) for storing data, and/or which storage locations of the storage zone contain data that has been marked as deleted. Although the storage management data 312 is depicted as part of the host computer 310, in at least some embodiments the host computer 310 can be configured to maintain the storage management data 312 in the storage medium 340 of the storage device 320 (or in one or more other storage media of one or more other storage devices).

The host computer 310 can be configured to determine that a storage zone of the storage device 320 is in need of garbage collection. For example, the host computer 310, using the storage management data 312, can determine that a storage zone (e.g., 344) contains a number of storage locations that have been marked as deleted, and that the storage zone can be reclaimed by rewriting the valid data still stored in the storage zone. The host computer 310 can determine an amount of data (i.e., valid data) stored in the storage zone and can determine that another storage zone (e.g., 342) in the storage medium 340 has sequential storage space available for the amount of data stored in the first of storage zone. For example, the host computer 310 can use the storage management data 312 to determine a number of storage locations within the storage zone that still contain valid data, and to identify another storage zone within the storage medium 340 that contains a range of contiguous storage locations that is sufficiently large to hold the valid data. The host computer 310 can then transmit the garbage collection command 340 to the storage device 320, identifying the source and target storage zones.

The host computer 310 can be configured to transmit data access commands to the storage device 320 to write data to and/or read data from the storage medium 340. In at least some embodiments, storage device controller 322 can be configured to prioritize the processing of such data access commands from the host computer 310 over the processing of the garbage collection command 350. For example, FIG. 3 depicts a scenario in which a data access command 362 is transmitted by the host computer 310 after the garbage collection command 350 is transmitted. In this scenario, the storage device controller 322 prioritizes the processing of the data access command 362 over the processing of the garbage collection command 350 and, thus, transmits a response 364 for the data access command 362 to the host computer 310 before the processing of the garbage collection command 350 is completed.

Optionally, the garbage collection command 350 can comprise a policy 356 that can be used by the storage device controller 322 to determine a priority to assign the garbage collection command 350 with respect to receive data access commands (e.g., 362). The policy 356 can comprise a priority level indicator that can be used to determine a relative priority level of the garbage collection command 350 with respect to other received commands. For example, the priority level indicator can indicate that the garbage collection command 350 should be treated as a relatively low priority (or as a relatively high priority, as a "normal" priority, etc.). Additionally or alternatively, the policy 356 can comprise a time frame (such as a number of seconds, a number of minutes, etc.) within which the garbage collection command 350 should be processed after it is received. The storage device controller 322 can prioritize processing the garbage collection command 350 with respect to other received data access commands using the time frame. For example, the storage device controller 322 can be configured to prioritize processing of the garbage collection command 350 such that other received commands have priority over the garbage collection command 350, so long as the garbage collection command 350 is completed before the end of the specified time frame. In at least some scenarios, copying the data from the source storage zone to the target storage zone can comprise multiple data read operations and/or multiple data write operations. In such scenarios, the storage device controller 322 can interrupt the processing of the garbage collection command 350 to perform one or more data read and/or data write operations for a data access command (e.g., 362) that has been received, and has a higher priority than the garbage collection command 350. After the processing of the higher priority command has completed, the processing of the garbage collection command 350 can be resumed.

Figure 4:
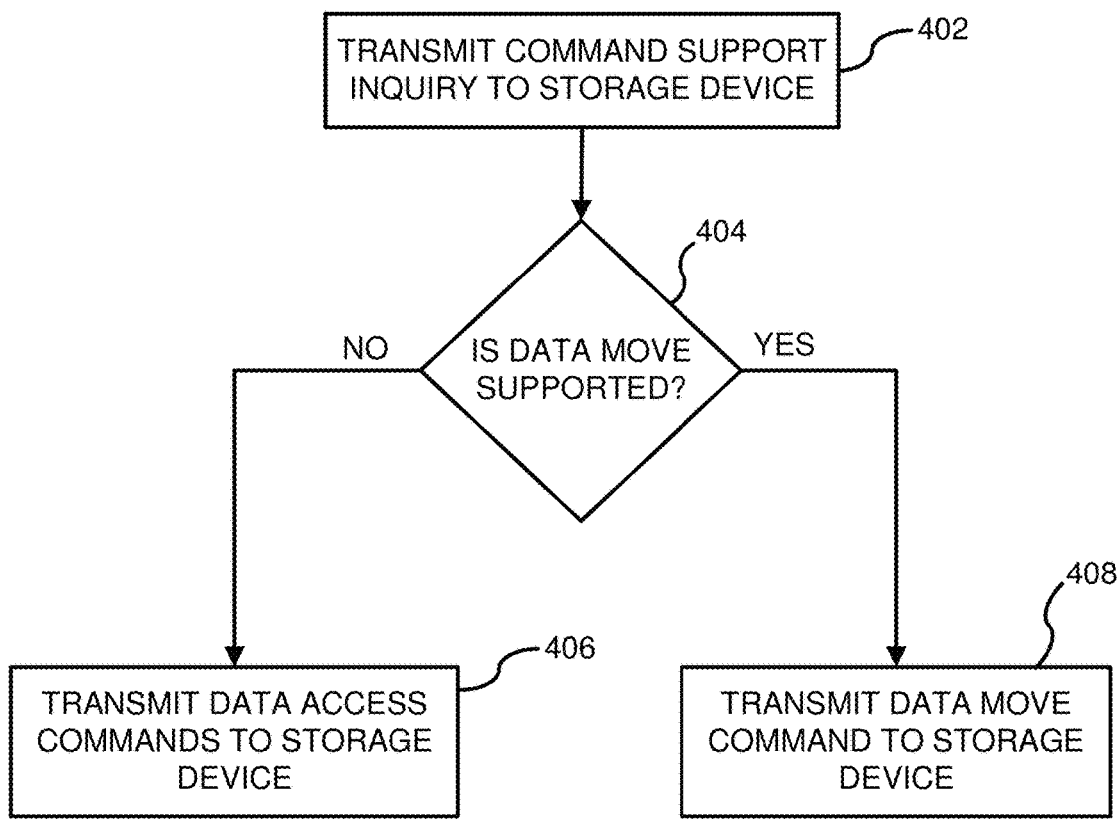
FIG. 4 is flowchart of an example method for performing garbage collection operations on a storage device.

FIG. 4 is a flowchart of an example method 400 for performing garbage collection operations on a storage device. At least some of the example systems described herein can be used to perform the example method 400. For example, all or part of steps 402-408 can be performed by a computing device or host computer as described herein.

At 402, a command support inquiry is transmitted to a storage device to determine whether or not a data move command is supported by the storage device. The command support inquiry can be transmitted to a storage device by a host computer connected to the storage device via one or more physical and/or logical connections. In at least some embodiments, the command support inquiry can be a command to inspect the contents of one or more firmware pages of the storage device. Inspected firmware pages can comprise details about various features that are supported by the storage device. In a different or further embodiment, a storage device controller of the storage device can be configured to receive the command support inquiry and to transmit a response, indicating whether or not the data move command is supported.

At 404, it is determined, based on a response to the command support inquiry, whether the data move command is supported by the storage device. In an embodiment where the command support inquiry is a command to inspect the contents of one or more firmware pages of the storage device, determining whether the data move command is supported can comprise searching the contents of the one or more firmware pages for a value that indicates that the data move command is a supported feature of the storage device. In an embodiment where a response is received from a storage device controller of the storage device, the response can comprise a value indicating whether or not the data move command is supported. The response can be analyzed to determine whether the storage device does or does not support the data move command.

If the data move command is supported then, at 408, the data move command is transmitted to the storage device. The data move command can indicate that data stored in one or more zones of the storage device should be moved to one or more different zones of the storage device. Responsive to receiving the data move command, the storage device can be configured to perform one or more data access operations (such as data read operations and data write operations) to relocate data from one or more storage zones of the storage device to one or more other storage zones of the storage device. In at least some embodiments, the data move command can comprise a source identifier (such as a source zone identifier, a range of source storage location addresses, etc.) and a target identifier (such as a target zone identifier, a range of target storage location addresses, etc.). Upon receipt of such a command, the storage device can to perform data access operations to move data from the identified source zone (or source storage location address range) to the identified target zone (or target storage location address range) within the storage device.

If the data move command is not supported then, at 406, multiple data access commands are transmitted to the storage device to move the data from the one or more storage zones to the one or more other storage zones. For example, if the data move command is not supported by the storage device then the host computer connected to the storage device can transmit one or more data read commands to the storage device in order to retrieve data from one or more storage zones of the storage device. The host computer can then transmit one or more data write commands to write the retrieved data to another one or more storage zones of the storage device. Thus, a host computer (or other computing device) can be configured to determine whether a given storage device supports the data move command. The host computer can take advantage of the data move command for performing garbage collection on the storage device if it is supported, but can fall back to a manual garbage collection process for storage devices that do not support the data move command.

Figure 5:
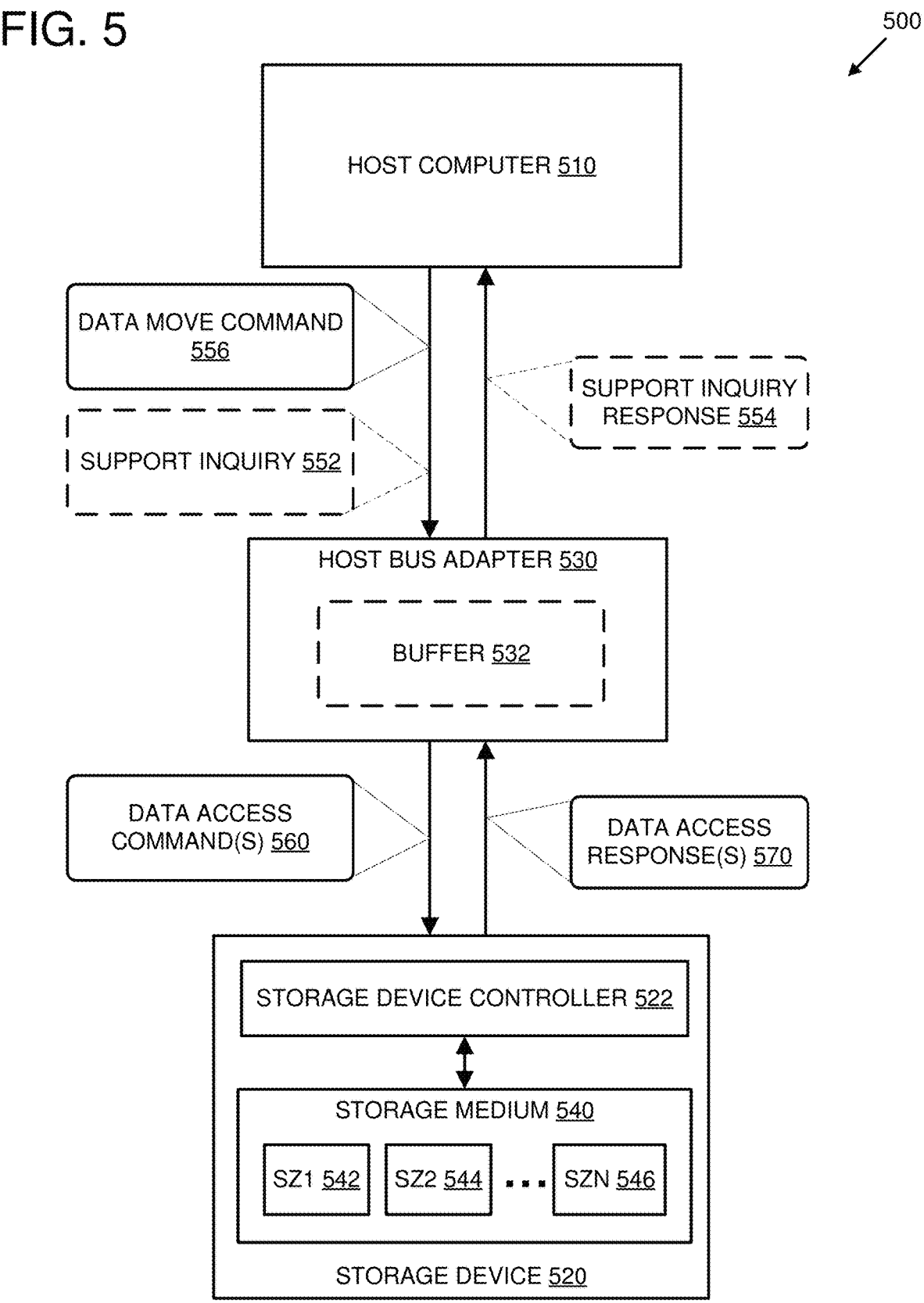
FIG. 5 is a system diagram depicting an example system comprising a host bus adapter configured to support a data move command.

FIG. 5 is a system diagram depicting an example system 500 comprising a host bus adapter 530 configured to support a data move command 556 for an attached storage device 520. The host bus adapter 530 can be configured to enable support for the data move command 556 for the attached storage device 520. The attached storage device 520 comprises a storage device controller 522 and a storage medium 540 comprising a plurality of storage zones 542-546.

The host bus adapter 530 can be configured to receive the data move command 556 from the host computer 510. The host bus adapter 530 can process the data move command 556 by transmitting one or more data access commands 560 to the attached storage device 520 in order to move data from one or more of the storage zones 542-546 to another one or more of the storage zones 542-546. For example, the data move command 556 can identify a source range of storage locations within one of the storage zones (e.g., 544) and a target range of storage locations within another one of the storage zones (e.g., 546). The host bus adapter 530 can be configured to transmit the one or more data access commands 560 to the storage device 520 to read data stored in the source storage location address range and to write the data to the target storage location address range. The storage device controller 522 can be configured to receive one or more of the data access commands 560. The storage device controller 522 can perform one or more data read operations to retrieve the data from storage locations associated with the source storage location address range and to transmit the retrieve data in one or more data access responses 570 to the host bus adapter 530. The storage device controller 522 can be configured to then receive another one or more of the data access commands 560 and to perform one or more data write operations to write the data to the target storage location address range. Optionally, the host bus adapter 530 can be configured to store the retrieved data in an internal buffer 532, and to transmit the buffer data back to the storage device 520 in one or more data write access commands.

Additionally or alternatively, the host bus adapter 530 can be configured to transmit a data move command (or garbage collection command) to the storage device 520 instead of the one or more data access commands 560. For example, the host bus adapter 530 can be configured to determine whether the storage device 520 supports data move commands. If the storage device 520 supports data move commands, then the host bus adapter 530 can transmit the data move command 556 (or a different data move command) to the storage device 520. If the storage device 520 does not support data move commands, then the host bus adapter 530 can transmit the one or more data access commands 560 to the storage device 520 to move data from one or more of the storage zones 542-546 to another one or more of the storage zones 542-546. Determining whether the storage device 520 supports data move commands can comprise transmitting a support inquiry command to the storage device 520.

In at least some embodiments, the host computer 510 can be configured to transmit a support inquiry command 552 to the host bus adapter 530 to determine whether the attached storage device 520 supports the data move command 556. The host bus adapter 530 can be configured to transmit a response 554 to the host computer 510, indicating that the data move command 556 is supported by the storage device 520. Thus, the host bus adapter 530 can be used to make it appear to the host computer 510 as of the attached storage device 520 supports the data move command 556 when, in fact, the data move command 556 is not natively supported by the storage device 520.

In at least some embodiments, the host bus adapter 530 can be connected to multiple storage devices. In such embodiments, the host bus adapter 530 can be configured to receive a garbage collection request (not shown) from the host computer 510. Responsive to receiving the garbage collection request, the host bus adapter can perform garbage collection operations for the connected storage devices. For example, if one or more of the connected storage devices are configured to support a data move command, the host bus adapter 530 can transmit data move commands to the one or more storage devices to cause the storage devices to move data within the storage devices to reclaim one or more storage zones. Additionally or alternatively, the host bus adapter 530 can transmit data access commands (such as data access commands 560) to the multiple storage devices to move data from one or more zones of the storage devices to one or more other zones of the storage devices.

In at least some embodiments, upon receipt of the garbage collection request from the shot computer 510, the host bus adapter 530 can be configured to identify one or more storage zones in one or more of the connected storage devices that can be reclaimed. For example, for each connected storage device, the host bus adapter 530 can determine whether one or more zones within the storage device is/are candidates for reclamation and whether there is available space in one or more other zones of the storage device into which valid data stored in the one or more candidate zones can be relocated. For each storage device in which one or more zones can be reclaimed, the host bus adapter 530 can transmit a data move command (or one or more data access commands) to reclaim the one or more storage zones of the storage device.

Figure 6:
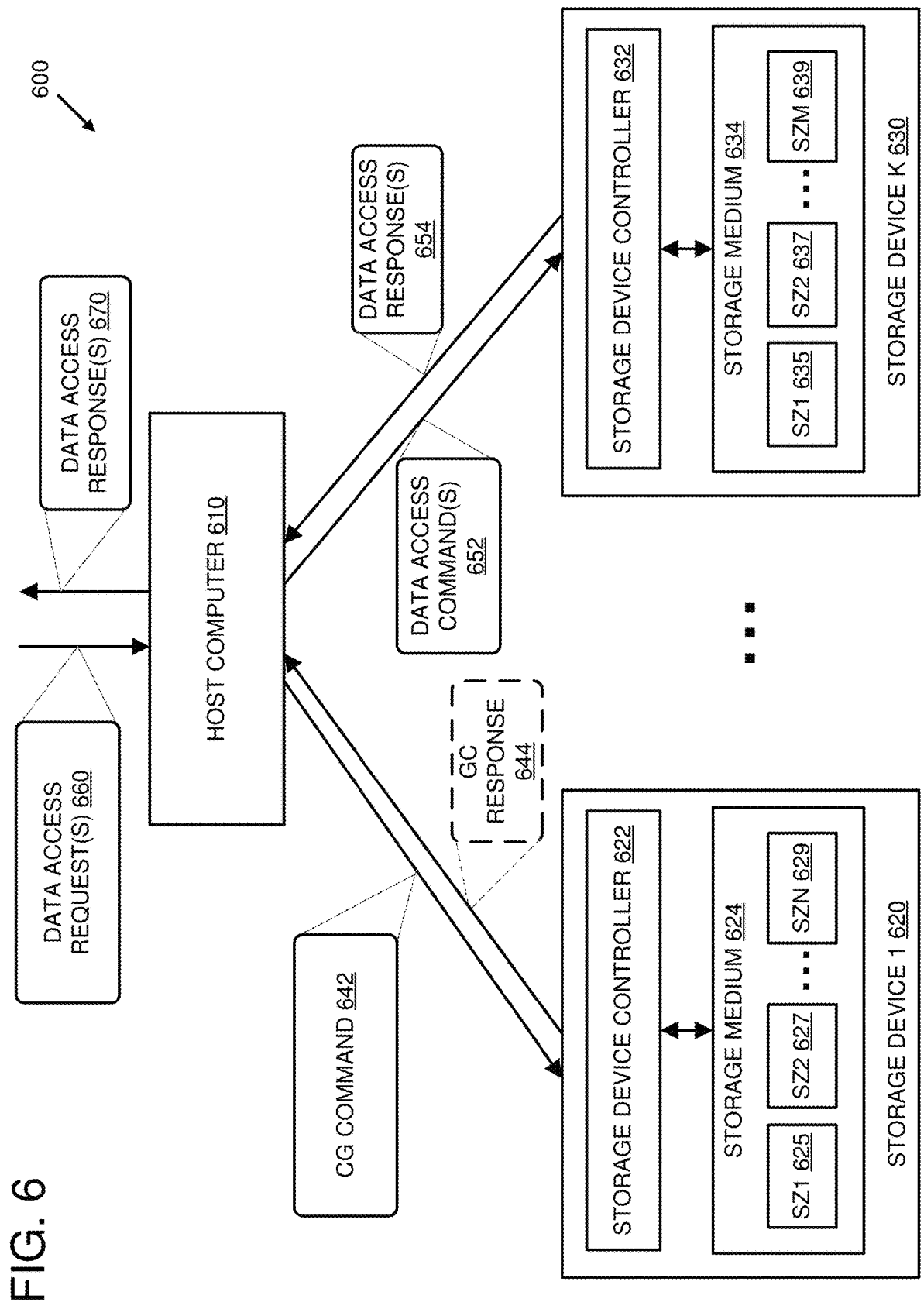
FIG. 6 is a system diagram depicting an example system comprising a host computer connected to multiple storage devices configured to process garbage collection commands.

FIG. 6 is a system diagram depicting an example system 600 comprising a host computer 610 connected to multiple storage devices 620-630. The multiple storage devices 620-630 are configured to process garbage collection commands (e.g., 642) and data access commands (e.g., 652). The host computer 610 can be connected to the multiple storage devices 620-630 via one or more physical connections, one or more logical connections, or some combination thereof. In a particular embodiment, the host computer 610 is a JBOD device, wherein each of the storage devices 620-630 is connected to the host computer 610 via a separate host bus adapter (not shown).

Each of the multiple storage devices 620-630 can comprise a storage device controller and one or more storage media. For example, the storage device 620 comprises a storage device controller 622 and a storage medium 624, and the storage device 630 comprises a storage device controller 632 and a storage medium 634. The storage media of the storage devices 620-630 can each contain a plurality of storage zones. For example, the storage medium 624 comprises storage zones 625-629, and the storage medium 634 comprises storage zones 635-639. A storage zone of a storage device can be made up of a plurality of data storage locations (such as data blocks or the like).

The host computer 610 can be configured to receive one or more data access requests 660 via a computer network. The host computer 610 can be configured to process the data access requests 660 by transmitting data access commands to one or more of the multiple storage devices 620-630 to write data to one or more of the storage devices 620-630 and/or to read data from one or more of the storage devices 620-630. For example, the host computer 610 is depicted in FIG. 6 as transmitting one or more data access commands 652 to the storage device 630, and receiving one or more data access responses 654 from the storage device 630.

The host computer 610 can transmit one or more data access responses 670 after the processing of the one or more data access requests 660 is complete. For example, if a given data access request is a request for data stored in one or more of the storage devices 620-630, the host computer 610 can retrieve the requested data from the one or more of the storage devices and transmit the requested data back to the requester in one or more of the data access response(s) 670.

The host computer 610 can be configured to transmit garbage collection commands to the storage devices 620-630. For example, in FIG. 6 the host computer 610 is depicted as transmitting a garbage collection response 642 to the storage device 620. A garbage collection command (e.g., 642) can identify one or more source storage zones and one or more target storage zones of a storage device. The storage device controller of the storage device can be configured to process the garbage collection command by moving data from the one or more source storage zones to the one or more target storage zones. For example, the storage device controller 622 can process the garbage collection command 642 by moving data stored in an identified source storage zone (e.g., 625) to an identified target storage zone (e.g., 629). In at least some embodiments, the storage device controller can be configured to transmit a response to the host computer 610, indicating that a processing of the garbage collection command is complete. For example, in FIG. 6 the storage device controller 622 is depicted as transmitting a response 644 to the host computer 610.

In at least some embodiments, the host computer 610 is configured to manage storage operations for the storage devices 620-630. The host computer 610 can monitor the status of the various storage zones in the storage devices 620-630 and can identify storage zones that are in need of garbage collection. The host computer 610 can be configured to transmit a garbage collection command to a storage device containing the storage zone in need of garbage collection, indicating that the data in the storage zone should be consolidated and move to another storage zone of the storage device.

In a different or further embodiment, the host computer 610 can be configured to monitor data access activity for the various storage devices 620-630. The host computer 610 can detect when data access activity for a given storage device is low and can transmit one or more garbage collection commands to the storage device while data access demand for the storage device remains low. For example, the host computer 610 can transmit the garbage collection command 642 to the storage device 620 when a number of data access requests targeting the storage device 620 falls below a specified threshold.

Figure 7:
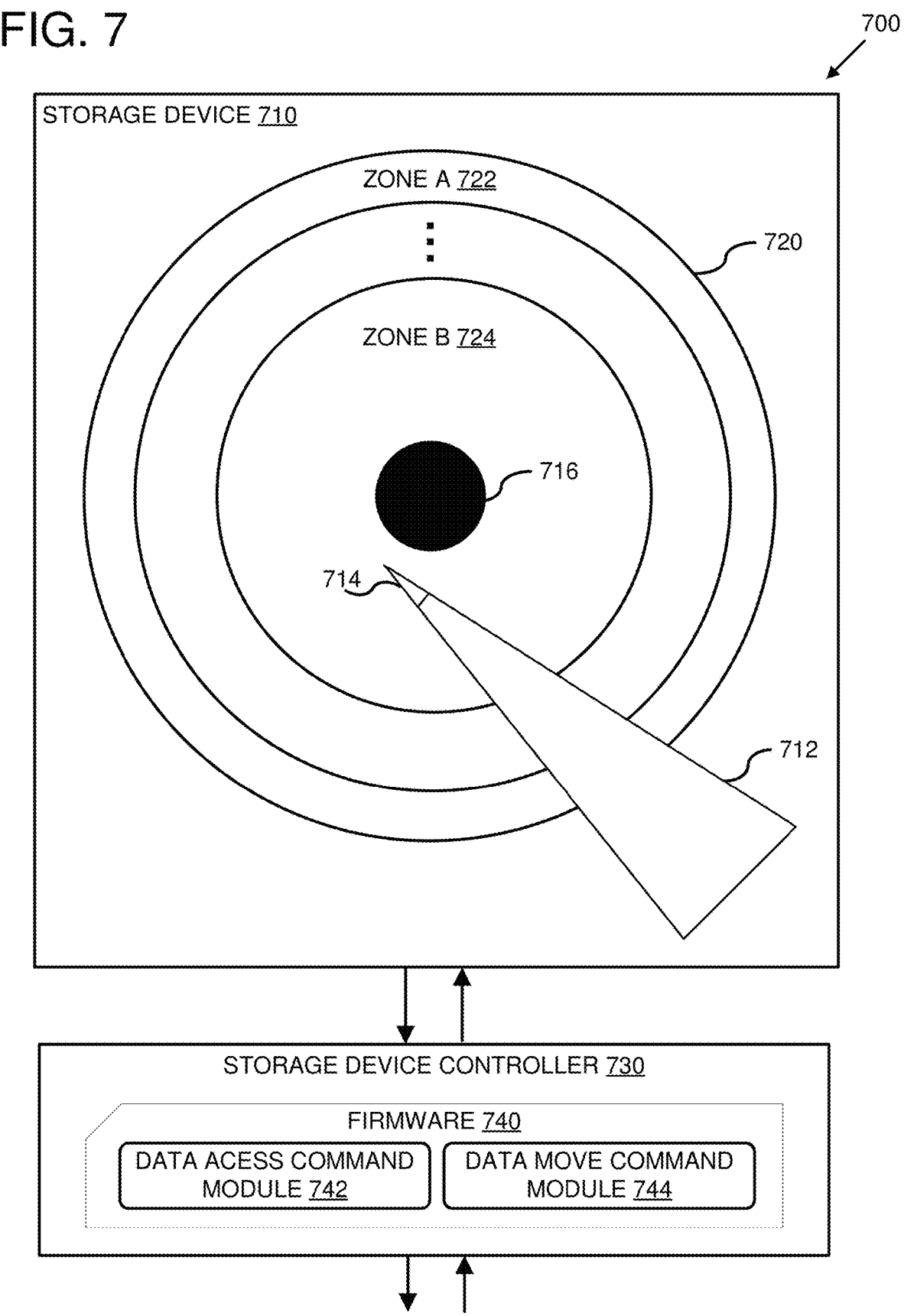
FIG. 7 is a system diagram depicting an example storage device configured to support a data move command.

FIG. 7 is a system diagram depicting an example storage device 700 configured to support a data move command. The example storage device 700 can be used as a storage device in any of the examples described herein.

Storage device 710 comprises a magnetic disk 720 that can be rotated on a spindle 716. The storage device 710 also comprises a moveable actuator arm 712 with a read/write head 714. The actuator arm 712 can be rotated on an actuator axis (not shown) by an actuator (not shown) to move the read/write head 714 over different portions of the magnetic disk 720. The storage device 710 is configured to write data to and to read data from the magnetic disk 720 using the read/write head 714. The read/write head 714 can comprise a single head that can perform both read and write operations. Alternatively, the read/write head 714 can comprise two separate heads for reading and writing, respectively. The storage device 710 can be configured to use the read/write head 714 to write data to the magnetic disk 720 in multiple concentric circular tracks as the magnetic disk is rotated on the spindle 716.

A storage device controller 730 can send write and read access commands to the storage device 710 to write data to and read data from the storage device 710. The storage device controller 730 can specify a location on the magnetic disk 720 at which the data is to be written or from which the data is to be read. For example, each unit of data stored on the magnetic disk 720 can have a unique address, such as an LBA, that identifies the location on the magnetic disk 720 where it is stored.

The storage device controller 730 can designate separate zones 722-724 on the magnetic disk 720, on which data can be stored. A zone can comprise all or part of one or more circular tracks of the magnetic disk 720. In at least some embodiments, data is written to the storage zones 722-724 as separate units. For example, in an embodiment where data is written to the magnetic disk 720 using an SMR format, buffer areas can be placed between the zones 722-724 so that separate zones can be targeted by write operations. (Due to the overlapping nature of SMR formats, updating data requires rewriting data that is "overlapped" by the data being updated. By separating the magnetic disk 720 into zones, only the zone containing the updated data has to be rewritten.)

The storage device controller 730 comprises an integrated circuit (not shown) running a firmware 740 containing data management modules 742-744 that can be used by the storage device controller 730 to perform data management operations. The storage device controller 730 can use the data access command module 742 to process data access commands to retrieve data from, and write data to, the storage medium 720. For example, the data access command module 742 can comprise instructions for operating the actuator arm 712, operating the spindle 716, and operating the read/write head 714 to retrieve data from, and write data to, the magnetic disk 720.

The storage device controller 730 can use the data move command module 744 to process data move commands to move data from one of the storage zones 722-724 to another of the storage zones 722-724. Moving data from one storage zone to another storage zone can comprise retrieving the data from storage locations in a source storage zone using one or more random access read operations and/or one or more sequential read operations, and writing the data to a target storage zone using one or more sequential write operations. In at least some embodiments, a received data move command can comprise a source storage location address range and a target storage location address range. The storage device controller 730 can be configured to identify a range of physical storage locations on the magnetic disk 720 within one of the storage zones (e.g., 722) associated with the source storage location address range and to perform one or more data read operations to retrieve data stored in the range of physical storage locations. The storage device controller 730 can be configured to identify another range of physical storage locations on the magnetic disk 720 within another of the storage zones (e.g., 724) and to perform one or more data write operations to write the retrieved data to the another range of physical storage locations. In further embodiments the firmware 740 contains additional modules for executing additional commands.

Figure 8:
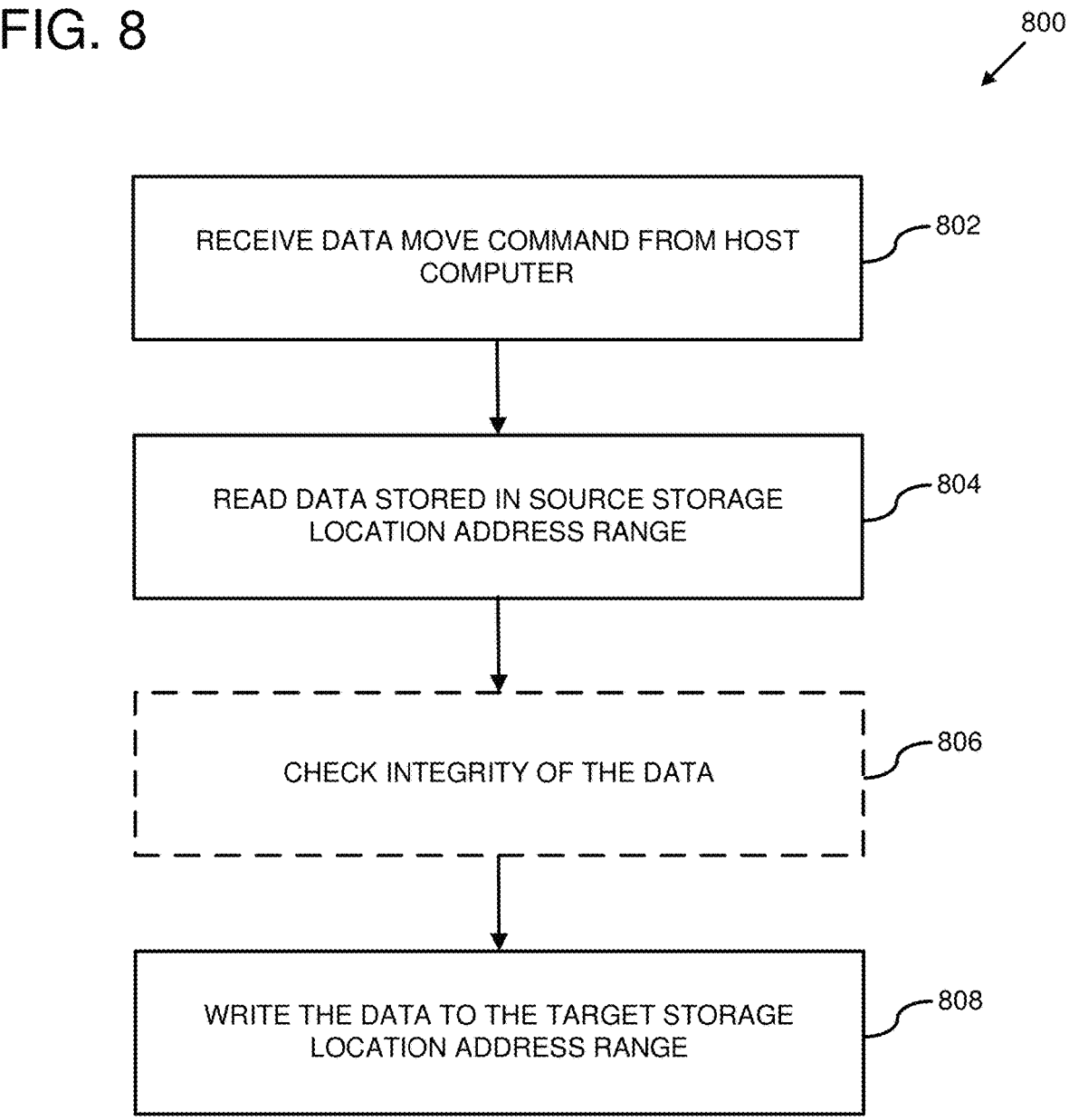
FIG. 8 is a flowchart of an example method for processing a data move command.

FIG. 8 is a flowchart of an example method 800 for processing a data move command. Any of the example systems described herein can be used to perform the example method 800. For example all or part of the steps 802-808 can be performed by a storage device as described herein. Additionally or alternatively, all or part of the steps 802-808 can be performed by an external hardware device (such as a host bus adapter) connected to a storage device.

At 802, a data move command is received from a host computer. The data move command comprises a source storage location address range and a target storage location address range. The data move command can be received from the host computer via one or more physical connections, one or more logical connections, and/or a combination thereof. In at least some embodiments, the source storage location address range and the target storage location address range identify addresses for ranges of storage locations in separate storage zones of a storage device. For example, the source storage location address range can comprise a range of LBAs in one storage zone of the storage device, and the target storage location address range can comprise another range of LBAs in another storage zone of the storage device.

At 804, data stored in one or more data blocks associated with the source storage location address range is read from the storage device. In at least some embodiments, the data is read from one or more data blocks in one or more physical storage media of the storage device and stored in a temporary buffer of the storage device. Alternatively, the temporary buffer can be part of an external hardware device connected to the storage device. The external hardware device can be configured to read the data from the one or more data blocks of the storage device and store the data in the temporary buffer.

Optionally, at 806, the integrity of the data is checked. Example data integrity check methods include the use of low-density parity-check (LDPC) codes, the use of cyclic redundancy check (CRC) checksums, etc. Additionally or alternatively, the storage device can comprise an error-correcting code (ECC) memory. In at least some cases, if data corruption is detected, the data corruption can be corrected before the data is written to the target storage location address range at 808. The data integrity check can be performed by a storage device controller of the storage device. For example, as the data is read from the source storage location address range, the storage device controller can check the integrity of the data and, if corruption is detected, the storage device controller can ix the corruption, or flag the data as corrupted and unrecoverable.

At 808, the data is written to one or more data blocks of a storage medium of the storage device associated with the target storage location address range. In at least some cases, the storage medium to which the data is written can be a same storage medium from which it was read at 804. If it is determined that the target storage location address range is associated with a contiguous range of data blocks, the data can be written to the one or more data blocks of the storage medium using one or more sequential write operations.

In at least some embodiments, a storage device controller of the storage device can be configured to perform the example method 800. For example, the storage device controller can receive the command at 802 and, responsive to receipt of the command, the storage device controller can read the data from the source storage location address range of the storage device at 804, optionally perform the integrity check on the read data at 806, and then write the data to the target storage location address range at 808.

Figure 9:
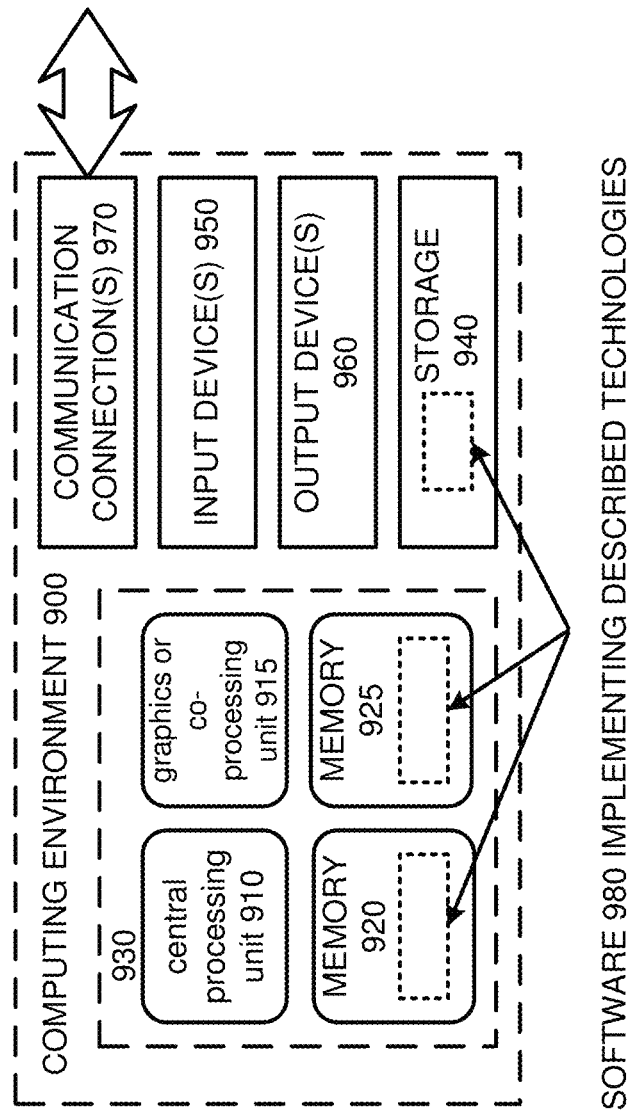
FIG. 9 depicts a generalized example of a suitable computing environment in which the described innovations may be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.).

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

In at least some embodiments, the computing environment 900 can be a computing device or host computer as described herein.

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

In at least some embodiments, the one or more communications connections 970 can be used by the computing environment 900 to remotely access one or more storage devices as described herein.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

In at least some embodiments, the storage 940 can comprise one or more storage devices as described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

In some embodiments, the storage 940, input devices(s) 950, output device(s) 960, communication connection(s)

970, and/or the graphics or co-processing unit 915 comprise one or more of the example electronic devices as described herein.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), a data center, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, assembly language, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), microprocessors, etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A system for supporting a storage device garbage collection command, the system comprising:

a computing device comprising a processor and memory storing computer-readable instructions that, when executed by the processor, cause the computing device to perform operations, the operations comprising:

transmitting an inquiry command to a storage device to determine whether a garbage collection command is supported by the storage device;

receiving a response from the storage device, indicating that the garbage collection command is supported;

subsequent to receiving the response, transmitting the garbage collection command to the storage device, wherein the garbage collection command comprises a source storage zone identifier that includes a first range of data block addresses within a first storage zone, a target storage zone identifier that includes a second range of data block addresses within a second storage zone, and a policy comprising a priority level indicator and a time frame; and the storage device, comprising a storage medium comprising a plurality of storage zones including the first storage zone and the second storage zone, and a storage device controller, wherein the storage device controller is configured to:

receive the inquiry command from the computing device;

transmit the response to the computing device, indicating that the garbage collection command is supported;

subsequent to the transmitting the response, receive the garbage collection command from the computing device; and responsive to receiving the garbage collection command:

determine, using the priority level indicator, a relative priority level of the garbage collection command with respect to other received data access commands, identify the first storage zone, of the plurality of storage zones, associated with the source storage zone identifier, identify the second storage zone, of the plurality of storage zones, associated with the target storage zone identifier, and copy data stored in the first range of data block addresses included in the source storage zone identifier to the second range of data block addresses included in the target storage zone identifier, wherein the copying is interrupted based on the relative priority level of the garbage collection command with respect to the other received data access commands and the garbage collection command is completed before an end of the time frame.

2. The system of claim 1, wherein the copying the data stored in the first range of data block addresses to the second range of data block addresses comprises:
writing the data to a sequential range of storage locations within the second storage zone.

3. The system of claim 1, wherein the operations performed by the computing device further comprise:
determining that the first storage zone of the storage device is in need of garbage collection;
determining an amount of data stored in the first storage zone; and
determining that the second storage zone has sequential storage space available for the amount of data stored in the first storage zone.

4. The system of claim 1, wherein:
data is stored in the plurality of storage zones using a shingled magnetic recording format.

5. A storage device comprising a storage medium and a storage device controller, wherein the storage device controller is configured to perform operations, comprising:
receiving an inquiry command to determine whether a garbage collection command is supported by the storage device;
transmitting a response indicating that the garbage collection command is supported by the storage device;
subsequent to transmitting the response, receiving the garbage collection command from a computing device to perform garbage collection, wherein the garbage collection command comprises a source storage zone identifier associated with a first storage zone of the storage device, a target storage zone identifier associated with a second storage zone of the storage device, a priority level indicator and a policy comprising a time frame, wherein the target storage zone identifier includes a range of data block addresses within the second storage zone; and
responsive to receiving the garbage collection command:
identifying the first storage zone of the storage medium that is associated with the source storage zone identifier,
identifying the second storage zone of the storage medium that is associated with the target storage zone identifier;
moving data stored in the first storage zone to the range of data block addresses, within the second storage zone, that is included in the target storage zone identifier;
receiving a data access command prior to completion of the moving the data stored in the first storage zone to the range of data block addresses within the second storage zone;
determining, using the priority level indicator, a relative priority level of the garbage collection command with respect to the data access command; and
wherein the moving the data is interrupted based on the relative priority level of the garbage collection command with respect to the data access command, and the garbage collection command is completed before an end of the time frame.

6. The storage device of claim 5, wherein:
the source storage zone identifier includes a range of data block addresses within the first storage zone; and
the moving the data stored in the first storage zone to the range of data block addresses within the second storage zone comprises:
reading the data from the range of data block addresses, within the first storage zone, that is included in the source storage zone identifier, and
writing the data to the range of data block addresses, within the second storage zone, that is included in the target storage zone identifier.

7. The storage device of claim 5, wherein the moving the data stored in the first storage zone to the range of data block addresses within the second storage zone comprises:
performing one or more data read operations to read the data from storage locations within the first storage zone; and
performing one or more sequential data write operations to write the data to a contiguous range of storage locations with the second storage zone.

8. The storage device of claim 5, wherein the moving the data stored in the first storage zone to the range of data block addresses within the second storage zone comprises:
checking an integrity of the data read from the first storage zone, by the storage device controller, before writing the data to the second storage zone.

9. A method, comprising:
receiving a command from a host computer at a storage device to determine whether a data move command is supported by the storage device;
transmitting a response indicating that the data move command is supported by the storage device;
subsequent to transmitting the response, receiving the data move command from the host computer, wherein the data move command includes a source data block address range of the storage device, a target data block address range of the storage device, a priority level indicator and a policy comprising a time frame; and
responsive to receiving the data move command:
determining, using the priority level indicator, a relative priority level of the data move command with respect to other received data access commands,
reading data stored in the source data block address range that is included in the data move command, and
writing the data to the target data block address range that is included in the data move command, wherein the reading and writing are interrupted based on the relative priority level with respect to the other received data access commands and the data move command is completed before an end of the time frame.

10. The method of claim 9, further comprising:
receiving the data move command from the host computer at a host bus adapter attached to the storage device; and
performing the reading the data and the writing the data using the host bus adapter.

11. The method of claim 9, further comprising:
checking an integrity of the data read from the source data block address range before writing the data to the target data block address range of the storage device.

12. The method of claim 9, wherein:
the source data block address range comprises a range of data block addresses in a storage zone of the storage device; and
the target data block address range comprises another range of data block addresses in another storage zone of the storage device.

13. The method of claim 9, wherein:
the storage device comprises a solid state storage medium; and
the method further comprises clearing storage locations of the solid state storage medium in the source data block address range after the reading of the data from the storage locations of the solid state storage medium in the source data block address range.

14. The method of claim 9, wherein the data move command is received from the host computer via a computer network.

\* \* \* \* \*